United States Patent
Uriarte

(10) Patent No.: US 6,265,799 B1
(45) Date of Patent: Jul. 24, 2001

(54) COUPLING FOR TRANSMISSION OF ROTATION IN A SYNCHRONOUS MOTOR

(75) Inventor: Javier Errasti Uriarte, Sta Ana (ES)

(73) Assignee: Fagor S. Coop., Mondragon (ES)

( * ) Notice: Subject to any disclaimer, the term of this patent is extended or adjusted under 35 U.S.C. 154(b) by 0 days.

(21) Appl. No.: 09/465,662

(22) Filed: Dec. 17, 1999

(30) Foreign Application Priority Data

Dec. 31, 1998 (ES) .................................................. 9802728

(51) Int. Cl.[7] .................................................. H02K 49/00
(52) U.S. Cl. .......................... 310/103; 417/363; 192/149
(58) Field of Search .............................. 310/51, 62, 63, 310/92, 100, 103; 417/363, 423 R; 192/25, 149; 464/160

(56) References Cited

U.S. PATENT DOCUMENTS

| | | | |
|---|---|---|---|
| 3,657,902 | * 4/1972 | Cataldo | 464/92 |
| 3,977,212 | * 8/1976 | Johansson | 464/83 |
| 4,307,584 | * 12/1981 | Sandiumenge | 464/74 |
| 4,328,879 | * 5/1982 | Tone | 180/219 |
| 4,483,685 | * 11/1984 | Spasiano et al. | 464/83 |
| 4,750,872 | 6/1988 | Palliser | 417/423 R |
| 4,795,402 | * 1/1989 | Reichardt | 464/74 |
| 4,861,240 | 8/1989 | Marioni et al. | 417/423.3 |
| 6,045,448 | * 4/2000 | Kern et al. | 464/74 |

FOREIGN PATENT DOCUMENTS

| | | | |
|---|---|---|---|
| 0320060A2 | * 12/1988 | (EP) | . |
| 0474004A2 | * 8/1991 | (EP) | . |
| 0514272A1 | * 5/1992 | (EP) | . |
| 0487785A1 | * 6/1992 | (EP) | . |
| 0551550A1 | * 7/1993 | (EP) | . |
| 0561013 | * 9/1993 | (EP) | . |
| 0551370B1 | * 3/1995 | (EP) | . |
| 0723329A2 | 7/1996 | (EP) | . |
| 2053060 | 7/1994 | (ES) | . |
| 2053372 | 7/1994 | (ES) | . |
| 2235726 | 1/1994 | (GB) | . |
| 94/21026 | * 9/1994 | (WO) | . |

* cited by examiner

*Primary Examiner*—Joseph Waks
(74) *Attorney, Agent, or Firm*—Fitzpatrick, Cella, Harper & Scinto

(57) ABSTRACT

The coupling (20) for transmitting rotation in a synchronous permanent magnetic rotor motor with a central rotor shaft (21), the load (24) being for instance the impeller of a drain pump, comprises a cavity (27) that receives one end of the rotor shaft (21), a radial cam (22) attached to the rotor shaft (21), and a noise and vibration cushioning member which engages with the cam (22). The elastic cushioning member (25) is housed in said cavity (27) compressed and subjected to a friction force in opposition to the rotation of the rotor shaft (21), limited so that it undergoes a cushioning displacement during motor starting under the impacts of the radial cam (22).

15 Claims, 2 Drawing Sheets

COUPLING FOR TRANSMISSION OF ROTATION IN A SYNCHRONOUS MOTOR

BACKGROUND OF THE INVENTION

1. Field of the Invention

The present invention relates to the constituent parts of a coupling between the load and rotor of a single-phase synchronous motor which transmits rotation to the load, such as the coupling between the rotor and the impeller of a drain pump, in order to eliminate noise and vibrations.

2. Prior Art

ES-2053372 (n° P9200335) describes a coupling of a drain pump impeller to the rotor shaft of its synchronous motor with a permanent magnetic rotor. The pump impeller has an internal cavity where the rotor shaft is coupled, sealed with a cap. At one end the rotor shaft for coupling to the impeller has an integral coupling cam, fitted with a radial drive catch, which moves back and forth in a free travel inside the impeller chamber for off-load pump starting. The coupling for rotation transmission is realized by means of a radial stopper integral with the impeller, and in its chamber it occupies a circular sector, which has a restricted angle in order to provide the rotor shaft and its drive catch with sufficient angle of free travel for starting the motor by vibration in either of the two directions of rotation. The drive catch engages afterwards with the impeller stopper and makes it turn at synchronous speed. To cushion the impacts of the drive catch against the impeller stopper in both directions of rotation the latter has a cushioning piece inserted made of elastomer material which protrudes laterally from both ends of the stopper in order to absorb the impacts and thereby reduce noise and vibration. This coupling solution has the drawback of being short-lived due to fatigue breakage of the cushioning stopper as a result of the heavy impacts against it, which cannot be remedied by making it thicker because said free angular play should not be reduced.

EP-514272 discloses a drain pump impeller coupling solution for transmitting the rotation of its synchronous motor in which a stopper integral with the impeller has cushioning devices formed or attached, consisting of springs in the form of flexible tabs on either side of the stopper. This solution also has a service life problem due to fatigue.

EP-474004 discloses a solution for the coupling of the rotor shaft to the rotor of a synchronous motor for transmitting rotation, which has an internal rubber ring attached to the rotor with two integrated stop lugs that impact against a radial cam drive catch attached to the rotor shaft, in a respective direction of rotation of the rotor, and it is an attached part made entirely of rubber affixed to the impeller. This solution also has a service life problem due to fatigue in the rubber cushioning ring attached to the impeller.

SUMMARY Of THE INVENTION

The object of the present invention is a coupling for the transmission of the rotor rotation to the load in a permanent magnetic rotor synchronous motor, such as a drain pump motor, as defined in claim 1. The transmission coupling according to the invention is realized in a chamber formed either in the load or in the rotor, and it comprises a solution to prevent vibration and noise during the off load starting of the motor as well as while the engine is running off load, as for instance when there is hardly any water to discharge in a pump. The coupling has the advantage of its easy construction, since it simplifies the conformation of the impeller or the rotor through doing away with the integral stopper contained in the known solutions.

The cushion stopper is made of a single piece, of a regular configuration, which is fitted compressed in the coupling cavity between two surfaces substantially perpendicular to the rotor shaft. In the transmission coupling according to the invention two effects take place for the cushioning of the impacts that occur on the cushioning member, an elastic deformation of the cushioning member as a result of the impacts with the cam drive catch, and an angular displacement of the cushioning member, which extends the duration of the impact whilst its magnitude is decreased in relation to the known solutions.

The displacement of the cushioning member depends on its compression between the two aforesaid engaging surfaces, but the result obtained is not affected substantially by the state of the surfaces nor by the characteristics of the cushioning member material. To achieve such cushioning displacement through its conformation and angular extension, the cushioning member undergoes a friction force in the cavity, which is overcome in the motor starting interval of time by the impacts produced against the cam drive catch, whereas said friction force has to be higher than the force exerted against the coupling cam when the motor is running so that engagement takes place with the drive catch at synchronous speed, while the cushioning member remains stationary.

Besides cushioning the transmission noise and vibration, the transmission coupling according to the invention has a long service life as the cushioning stop member does not undergo any permanent deformation or substantial fatigue.

DETAILED DESCRIPTION OF THE INVENTION

Figure 1:
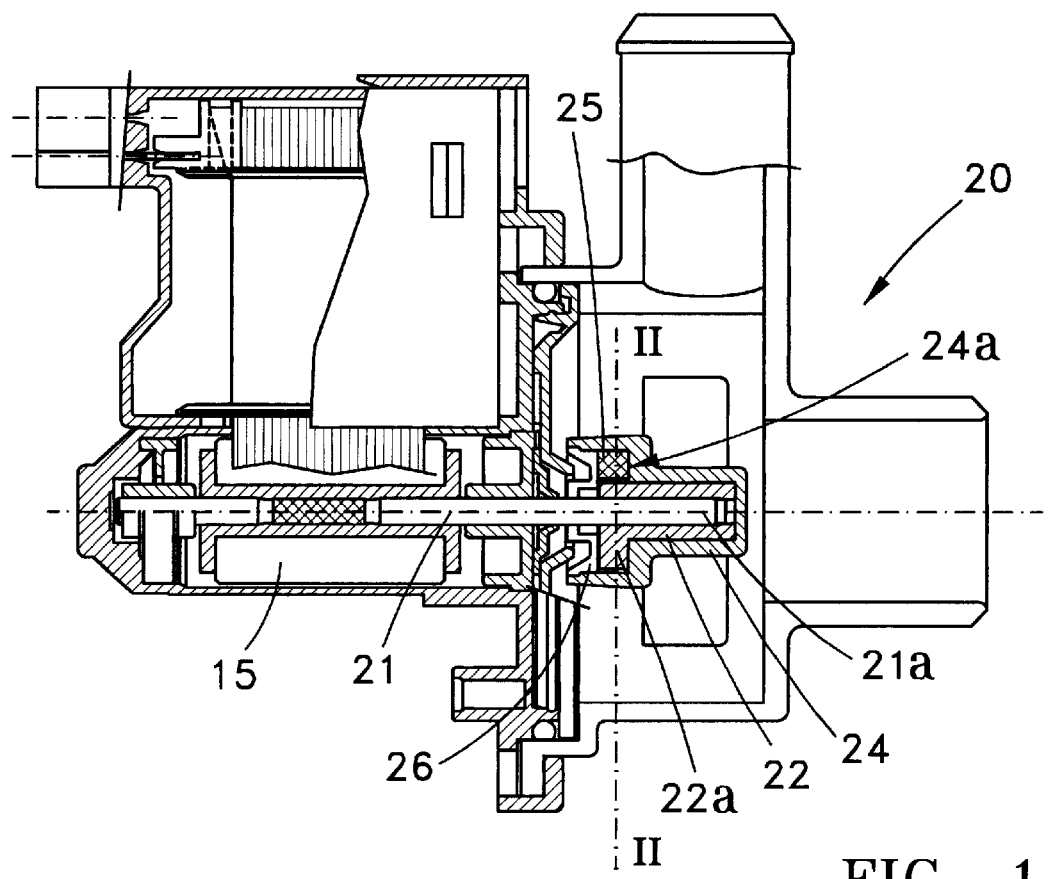
FIG. 1 is a cross-sectional view of a drain pump according to the invention, wherein the coupling is realized in a cavity in the pump impeller.
Figure 2:
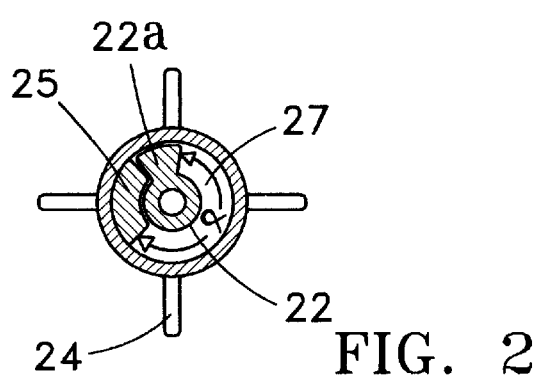
FIG. 2 is a cross-sectional view according to line II—II in FIG. 1.

With reference to FIGS. 1 to 2, a first preferred embodiment of the invention is a coupling 20 for the transmission of the rotation of rotor 15 to an impeller 24 of a drain pump, wherein the rotor shaft 21 drives the impeller 24 and is attached to the permanent magnet rotor 15 and to a coupling cam 22, which has a free angular travel alpha during starting (FIG. 2).

The transmission coupling comprises a uniformly cylindrical cavity 27 inside the impeller, a coupling cam 22 provided with a drive catch 22a housed in the internal cavity 27 in the impeller (FIG. 2), a cushioning member 25 for transmitting rotation, also housed in cavity 27, and a cap 26 for cavity 27 traversed by rotor shaft 21. The coupling cam 22 is attached to end 21a of the rotor shaft adjacent to the pump body. Cap 26 is disc-shaped. Cushioning member 25 has a cross section in the form of a ring gear sector, the larger arc of which is approximately the same as that of cavity 27, and it is positioned in the radial direction juxtaposed to the cylindrical wall of cavity 27, and in the axial direction fitted between wall 24a of impeller 24 and the inner surface of cap 26, and compressed by them. Thus, during motor starting, cushioning member 25 permits free turn alpha of the cam and undergoes a displacement with friction against the surface of said walls 24a and 26, and after starting drive catch 22a pushes the now stationary cushioning member 25, and the latter drives impeller 24 to transmit rotation.

Figure 3:
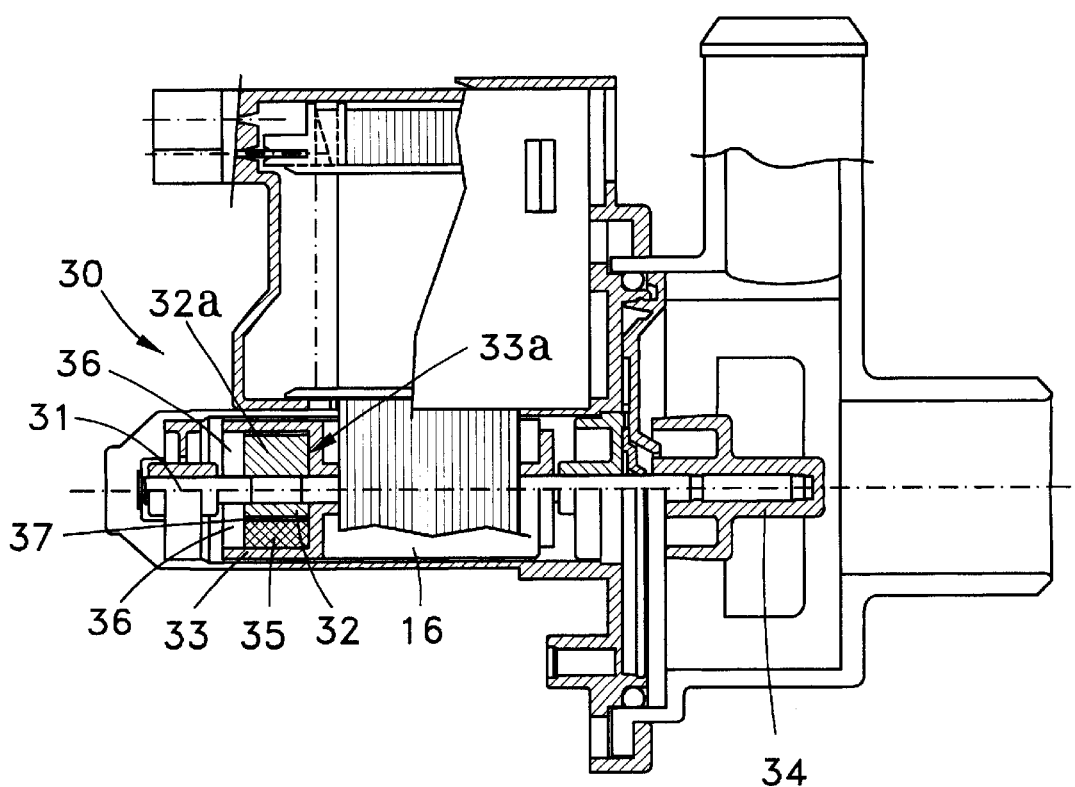
FIG. 3 is a cross-sectional view of a drain pump according to the invention, wherein the transmission coupling is realized in a cavity in the motor rotor.

With reference to FIG. 3, a second embodiment according to the invention is the transmission coupling 30, wherein the rotor 16 drives a rotor shaft 31 through the transmission coupling 30, and a pump impeller 34 is attached to one end of the rotor shaft 31. The transmission coupling 30 comprises a uniformly cylindrical cavity 37 in a box 33 attached to rotor 16, a coupling cam attached to the rotor shaft 31 and housed in the cavity 37, a cushioning member 35 and a cap 36 covering the box 33 axed traversed by the rotor shaft 31. The cushioning member 35 is made as in the coupling embodiment 20 (FIG. 1) described previously, and it is engaged in cavity 37 compressed axially between wall 33a of box 33 and the inner wall of cap 36. The box 33 attached to the rotor 16 drives the cam 32 and the rotor shaft 31 in synchronous rotation through the cushioning member 35. The cam 32 is provided with a radial catch 32a, which is driven by the cushioning member 35 for the transmission of rotation to rotor shaft 31.

What is claimed:

1. A Coupling for transmitting rotation from a central rotor shaft of a synchronous motor having an elongated permanent magnet rotor to a load, the coupling comprising:
   a uniformly cylindrical transmission cavity covered with a cap, the cavity receiving an end of the rotor shaft;
   a radial coupling cam attached to the rotor shaft and housed in the cavity;
   a cushioning member housed in the cavity for engaging the radial cam, wherein the cushioning member is made of an elastic material and is compressed in axial direction between the cap and a surface of the cavity, and wherein the cushioning member is subjected to a friction force in opposition to the rotation of the rotor shaft.

2. The transmission coupling of claim 1, wherein the load is a drain pump impeller, the transmission cavity is the interior of the pump impeller, the rotor shaft is supported by the rotor, and the radial cam transmits rotation to the impeller through the cushioning member.

3. The transmission coupling of claim 1, wherein the transmission cavity is conformed inside a box attached to the rotor, the load is a drain pump impeller attached to the rotor shaft, and the cushioning member transmits rotation to the rotor shaft through the radial cam.

4. A Coupling for transmitting rotation from a central rotor shaft of a synchronous motor having an elongated permanent magnetic rotor to a load, the coupling comprising:
   a uniformly cylindrical transmission cavity covered with a cap, the cavity receiving an end of the rotor shaft;
   a radial coupling cam attached to the rotor shaft and housed in said cavity,
   a cushioning member housed in said cavity for engaging the radial arm, wherein the cushioning member is made of an elastic material and is compressed in an axial direction between the cap and a surface of the cavity and is subjected to a friction force in opposition to the rotation of the rotor shaft, and wherein the cushioning member undergoes a cushioning displacement within the cavity in a direction opposite to the friction force when it bears the impacts from the radial cam during motor starting.

5. The coupling according to claim 4, wherein wherein the load is a drain pump impeller, the transmission cavity is the interior of the pump impeller, the rotor shaft is supported by the rotor, and the radial cam transmits rotation to the impeller through the cushioning member.

6. The coupling according to claim 4, wherein the transmission cavity is conformed inside a box attached to the rotor, the load is a drain pump impeller attached to the rotor shaft, and the cushioning member transmits rotation to the rotor shaft through the radial cam.

7. A Coupling for transmitting rotation from a central rotor shaft of a synchronous motor having an elongated permanent magnet rotor to a load, the coupling comprising:
   a uniformly cylindrical transmission cavity covered with a cap, the cavity receiving an end of the rotor shaft;
   a radial coupling cam attached to the rotor shaft and housed in the cavity;
   a cushioning member housed in the cavity for engaging the radial cam, wherein the cushioning member is made of an elastic material and is compressed in an axial direction between the cap and a surface of the cavity.

8. A Coupling for transmitting rotation from a central rotor shaft of a synchronous motor having an elongated permanent magnet rotor to a load, the coupling comprising:
   a uniformly cylindrical transmission cavity covered with a cap, the cavity receiving an end of the rotor shaft;
   a radial coupling cam attached to the rotor shaft and housed in the cavity;
   an elastic cushioning member held within the cavity by compression, wherein upon engagement with the radial coupling cam in a first direction, friction between the cushioning member and a surface of the cavity creates a force in a second direction opposite to said first direction.

9. The coupling according to claim 8, wherein the cushioning member is compressed in an axial direction between the cap and a surface of the cavity.

10. A Coupling for transmitting rotation from a central rotor shaft of a synchronous motor having an elongated permanent magnet rotor to a load, the coupling comprising:
    a uniformly cylindrical transmission cavity covered with a cap, the cavity receiving an end of the rotor shaft;
    a radial coupling cam attached to the rotor shaft and housed in the cavity;
    an elastic cushioning member held within the cavity by compression, wherein upon engagement with the radial coupling cam, the cushioning member is displaced around the cavity in a first direction until a friction force between the cushioning member and a surface of the cavity in a second direction opposite to said first direction stops the cushioning member from being displaced in the first direction.

11. The coupling according to claim 10, wherein the cushioning member is compressed in an axial direction between the cap and a surface of the cavity.

12. A method for reducing noise and vibration in a coupling, the coupling for transmitting rotation from a central rotor shaft of a synchronous motor having an elongated permanent magnetic rotor to a load, the coupling comprising a uniformly cylindrical transmission cavity covered with a cap, the cavity receiving an end of the rotor shaft, a radial coupling cam attached to the rotor shaft and housed in said cavity and an elastic cushioning member housed in said cavity for engaging the radial arm, the method comprising the steps of:
    compressing the cushioning member within the cavity;
    impacting the radial cam into the cushioning member in a first direction when the motor is switched on;

displacing the cushioning member in the first direction as a result of impacting;

creating a friction force in a second direction opposite to the first direction, the friction force being established between the cushioning member and said cavity as a result of the compression of the cushioning member within the cavity, wherein the friction force stops the displacement of the cushioning member thereby diminishing noise and vibration from the impact of the radial cam into the cushioning member to rotate the load.

13. The method according to claim 12, wherein the cushioning member is compressed in an axial direction between the cap and a surface of the cavity.

14. The method according to claim 12, wherein wherein the load is a drain pump impeller, the transmission cavity is the interior of the pump impeller, the rotor shaft is supported by the rotor, and the radial cam transmits rotation to the impeller through the cushioning member.

15. The method according to claim 12, wherein the transmission cavity is conformed inside a box attached to the rotor, the load is a drain pump impeller attached to the rotor shaft, and the cushioning member transmits rotation to the rotor shaft through the radial cam.

* * * * *